United States Patent [19]

Fujino et al.

[11] Patent Number: 4,792,823
[45] Date of Patent: Dec. 20, 1988

[54] CAMERA AND CAMERA SYSTEM

[75] Inventors: Akihiko Fujino, Sakai; Masaaki Nakai, Kawachinagano; Hiroshi Ootsuka, Sakai, all of Japan

[73] Assignee: Minolta Camera Kabushiki Kaisha

[21] Appl. No.: 139,061

[22] Filed: Dec. 22, 1987

Related U.S. Application Data

[63] Continuation of Ser. No. 73,842, Jul. 15, 1987, which is a continuation of Ser. No. 878,269, Jun. 25, 1986, abandoned.

[30] Foreign Application Priority Data

| Jun. 27, 1985 | [JP] | Japan | 60-141598 |
| Jun. 27, 1985 | [JP] | Japan | 60-141599 |
| Jun. 27, 1985 | [JP] | Japan | 60-141600 |
| Jun. 28, 1985 | [JP] | Japan | 60-143801 |
| Jul. 1, 1985 | [JP] | Japan | 60-145336 |
| Jul. 2, 1985 | [JP] | Japan | 60-145402 |
| Jul. 2, 1985 | [JP] | Japan | 60-145403 |
| Jul. 12, 1985 | [JP] | Japan | 60-145443 |

[51] Int. Cl.$^4$ ............................................. G03B 7/00
[52] U.S. Cl. ..................................... 354/446; 354/455; 354/286
[58] Field of Search ............... 354/412, 426, 432, 433, 354/443, 446, 448, 455, 286

[56] References Cited

U.S. PATENT DOCUMENTS

| 4,103,307 | 7/1978 | Shinoda et al. | |
| 4,168,892 | 9/1979 | Veda et al. | 354/286 |
| 4,179,202 | 12/1979 | Fukuhara | 354/448 |
| 4,266,865 | 5/1981 | Fukuhara | 354/455 |
| 4,297,012 | 10/1981 | Nakai | 354/412 |
| 4,304,472 | 12/1981 | Shinoda et al. | |
| 4,312,579 | 1/1982 | Araki | 354/443 |
| 4,325,617 | 4/1982 | Sahara et al. | 354/433 |
| 4,367,931 | 1/1983 | Kawai et al. | 354/448 |
| 4,401,373 | 8/1983 | Nakai | 354/412 |
| 4,435,057 | 3/1984 | Nakai et al. | 354/426 |
| 4,460,253 | 7/1984 | Kawai et al. | 354/446 |
| 4,477,161 | 10/1984 | Kawasaki et al. | 354/286 |
| 4,529,288 | 7/1985 | Nakai et al. | 354/286 |
| 4,552,446 | 11/1985 | Suda et al. | |
| 4,560,267 | 12/1985 | Nakai et al. | 354/412 |
| 4,561,752 | 12/1985 | Miyamoto et al. | 354/432 |
| 4,572,638 | 2/1986 | Nakai et al. | 354/286 |
| 4,652,109 | 3/1987 | Tsunekawa. | |

FOREIGN PATENT DOCUMENTS

56-122016 9/1981 Japan.
58-87546 5/1983 Japan.

Primary Examiner—Russell E. Adams
Attorney, Agent, or Firm—Burns, Doane, Swecker & Mathis

[57] ABSTRACT

A camera or camera system includes a depth of field preview device for stopping down an aperture of an objective lens mounted on the camera to a predetermined aperture value in response to a manual operation prior to its photographing operation, and an AE lock device for storing a light measuring signal indicative of the brightness of object in response to another manual operation. In the camera or camera system, proper exposure can be obtained even if the depth of field preview device and the AE lock device are intended to be operated together, with compensating and correcting exposure error which would be produced by operation of both devices.

36 Claims, 14 Drawing Sheets

CAMERA AND CAMERA SYSTEM

This application is a continuation, of application Ser. No. 073,842, filed July 15, 1987, which is a continuation of application Ser. No. 878,269, filed June 25, 1986 abandoned.

BACKGROUND OF THE INVENTION

1. Field of the Invention

The present invention relates to a camera and a camera system such as a single-lens reflex camera capable of TTL light measurement, and more particularly to a camera and a camera system having a depth of field preview mechanism for controlling the aperture diaphragm of an objective lens to a prescribed aperture value prior to photograghing operation.

2. Description of the Prior Art

There are known cameras having a depth of field preview mechanism (hereinafter call "preview mechanism") of the type described above.

However, in a camera which measures light transmitted through its objective lens in the condition its aperture diaphragm is fully opened and stores the measured data for use in exposure calculation, the following problem would ocurr by the provision of preview mechanism. If so-called AE lock is carried out in such a camera for storing the measured value while the aperture diaphragm is controlled by the preview mechanism to a prescribed aperture value, then the measured value on exposure measurement at a stopped down aperture remains stored even when the preview mechanism is thereafter released. Exposure calculation is therefore performed on the measured value that is stored, with the result that an error is produced which corresponds to the difference between the fully opened aperture value of the lens and the aperture value at the time the preview mechanism is in operation. Specifically, if a stored value Bv1 measured with the aperture stopped down by the preview mechanism should be used for exposure calculation as a measured value Bv0 with a fully opened aperture, then the difference Bv0−Bv1 would become an exposure calculation error.

Camera systems capable of changing lenses such as single-lens reflex camera systems are arranged such that exposure calculation is correct when a predetermined reference lens is mounted on the camera. When various lenses are changed on the camera, measured values of light for the same luminance in TTL light measurement at the fully opened aperture for those lenses vary from that of the reference lens.

There has already been proposed a camera system in which such a measurement difference is stored as an open-aperture measurement error Wvi in a ROM in each of the interchangeable lenses, and the stored data is used for correction in exposure measurement.

Where a preview mechanism capable of stopping down the aperture diaphragm to a prescribed aperture value is incorporated in such a camera system, since the wide-open-aperture measurement error Wvi is reduced when the preview mechanism is in operation, the above correction in exposure measurement will be excessive, and no proper exposure calculation will be effected. This problem will be described in more detail with reference to FIG. 1 of the accompanying drawings.

The curve B in FIG. 1 shows the relationship between an aperture value (F value) and the output Pa of a photometric cell, the relationship being linear with aperture. The curve D indicates the relationship between the aperture value (F value) and the output Pa of the photometric cell at the time an interchangeable lens having a minimum F value of 2.8 is mounted. Usually, the cell output Pa produced on exposure measurement at the fully open aperture when the interchangeable lens is mounted is different from that when the reference lens is mounted, by an open-aperture measurement error Wvi. Therefore, when an interchangeable lens is mounted, no accurate exposure control would be achieved unless the open-aperture measurement error Wvi were compensated for. Heretofore, the open-aperture measurement error Wvi has been compensated for by effecting an automatic exposure adjustment on exposure measurement with the fully open aperture. A result of such error compensation is indicated as E in FIG. 1.

The open-aperture measurement error Wvi is increased when the aperture is fully open, but is reduced as the aperture is stopped down by the preview mechanism. That is, as the aperture is stopped down, the outputs produced by the photometric cell at the time of changing lenses are rendered more uniform, and error compensation would be too excessive if effected during operation of the preview mechanism.

The output of the photometric cell which detects light coming from an object through the lens is not in linear relationship to the aperture value; it is especially nonlinear nearby the fully open aperture value. In TTL light measurement, it is known from the $cos^4$ law and vignetting that the brightness of the edge of the image field is less than that of the center thereof. Such a reduction is greater as the aperture is closer to the fully open aperture value. Therefore, in the vicinity of the fully open aperture value, if the aperture is stopped down by equivalent 1 Ev, the output of the photometric cell does not vary equivalent to 1 Ev. Where this error is corrected so as to be acceptable at exposure measurement at the fully open aperture, an error is produced of necessity for exposure measurement at the stopped down aperture.

The above problem will also be described in greater detail with reference to FIG. 1. The curve A indicates the relationship between the aperture value (F value) and the output Pa of the photometric cell at the time the reference lens is mounted. If adjusted for automatic exposure control, the vertial axis of the FIG. 1 graph corresponds to a shutter speed (S.S.) that is automatically set. As described above, the curve B is the linearly adjusted relationship between the cell output Pa and the aperture value (F value) on exposure measurement at the open aperture, corresponding to the shutter speed when the reference lens is mounted. Comparison between the curves A and B indicates that they coincide with each other at the open aperture, but differ from each other when the aperture is stopped down. This means that when a certain aperture value, other than the open aperture, is set, the shutter speed which is automatically set by the result of exposure measurement at the open aperture is different from the shutter speed which is automatically set by the result of exposure measurement when the preview mechanism is operated.

In camera systems in which lenses are interchangeable such as single-lens reflex camera systems, the measured value of light which is obtained by TTL light measurement is stored in a memory, exposure calculation is effected on the basis of the stored value, and then an aperture value and a shutter speed are displayed. Where a preview mechanism is combined with such a camera system, when a power supply battery is detached while the preview mechanism is in operation, the data stored by the operation of the preview mechanism is lost, and so the correct aperture value will not be displayed when the power supply battery is attached again.

When the lens is detached while the preview mechanism is in operation, an aperture presetting lever on the camera body is in position corresponding to the aperture value set by the operation of the preview mechanism. If the minimum F value of a newly mounted lens is different from that of the detached lens, the aperture value displayed on the camera body remains to be that before the lens was changed, whereas the actual aperture value is a value that should be reduced from the open aperture value for the newly mounted lens through a number of steps determined by the aperture presetting lever. As a consequence, different aperture values are experienced before and after the lenses are changed. An error will therefore be caused if the user thinks that the newly mounted lens will be controlled by the aperture value that was displayed prior to the lens replacement.

Where a zoom lens of variable focal length is mounted on a camera system having a preview machanism, when zooming is effected while the aperture is stopped down by the preview mechanism to a diameter corresponding to a certain aperture value, the aperture value varies with such zooming. In an ordinary camera system, the aperture value immediately prior to the operation of the preview mechanism remains displayed, and hence the aperture value displayed during operation of the preview mechanism with a zoom lens is not an accurate aperture value.

If so-called AE lock for storing the measured value of light at the time of manual operation is effected in such a camera system while the preview mechanism is being operated, the measured value at the instant of manual operation is stored, and an appropriate shutter speed is calculated on the basis of the stored value. Where a zoom lens of variable focal length is employed in such a camera system, when zooming is carried out while AE lock is set during operation of the preview mechanism, the amount of light falling on a film varies since the aperture value changes with zooming, whereas the calculated shutter speed remains unchanged because of the AE lock. This results in an exposure error.

OBJECTS SUMMARY OF THE INVENTION

It is an object of the present invention to provide a camera capable of eliminating an error which would otherwise be produced by using a measured value $Bv1$ at a stopped down aperture while a preview mechanism is in operation and AE lock is set, as a measured value $Bv0$ at a fully open aperture.

Another object of the present invention is to provide a camera system capable of preventing excessive compensation of the above described open-aperture measurement error $Wvi$ when a preview mechanism is operated.

Still another object of the present invention is to provide a camera system which causes no error in exposure display and exposure control during exposure measurement at a stopped down aperture through operation of a preview mechanism.

A still further object of the present invention is to provide a camera having an AE lock mechanism and a preview mechanism, the camera producing no exposure display and control error while the AE lock mechanism is in operation before the preview mechanism is operated.

Still another object of the present invention is to provide a camera system capable of giving the user a warning to prevent an exposure error from being produced due to erroneous display of an aperture value.

Still another object of the present invention is to provide a camera system capable of accurately displaying an aperture value even during operation of a preview mechanism.

A still further object of the present invention is to provide a camera system which prevents an exposure error from being produced even if zooming is performed while both a preview mechanism and an AE lock mechanism are in operation.

A yet further object of the present invention is to provide a camera having a preview mechanism and an AE lock mechanism, the camera allowing the preview mechanism to operate even during operation of the AE lock mechanism and storing an accurate measured value of light in such operation of the preview mechanism.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Figure 1:
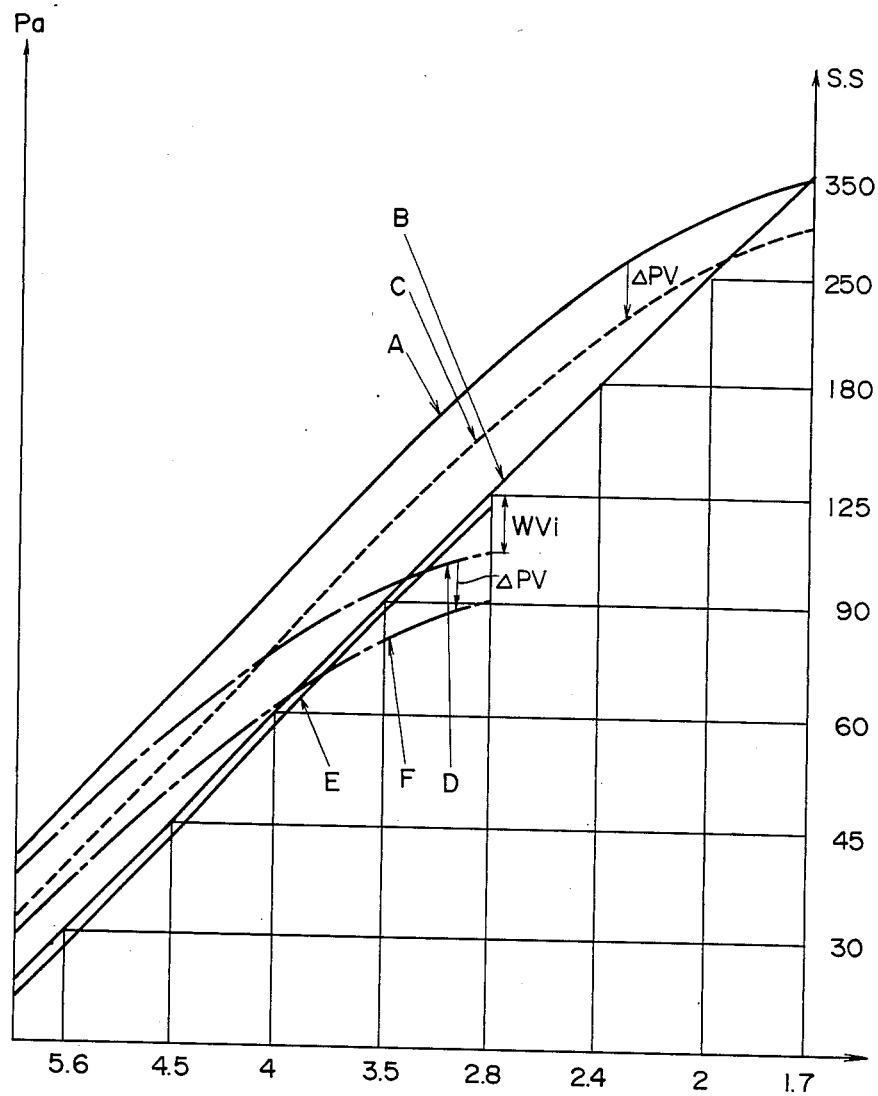
FIG. 1 is a graph showing the relationship between aperture values and measured values obtained by TTL photometry.

In FIG. 1, the curve A indicates the relationship between an aperture value (F value) and the output Pa of a photometric cell in the condition a given reference lens is mounted. If adjusted for automatic exposure control, the vertical axis of the FIG. 1 graph corresponds to a shutter speed (S.S.) that is automatically set. The curve B is the relationship between the cell output Pa and the aperture value (F value) linearly adjusted to an exposure measurement at a wide open aperture, and corresponding to the shutter speed when the reference lens is mounted. Comparison between the curves A and B indicates that they coincide with each other at the open aperture, but differ from each other when the aperture is stopped down. This means that when a certain aperture value, other than the open aperture, is set, the shutter speed which is automatically set according to the result of exposure measurement at the open aperture is different from the shutter speed which is automatically set according to the result of exposure measurement when a preview mechanism is operated.

According to an embodiment of the present invention, a certain value ΔPv is subtracted as a preview compensation value from the output of the photometric cell (actually, from an exposure value Ev calculated from the cell output) during operation of the preview mechanism, so that an error in display and exposure control while the preview mechanism in operation is held to a minimum. A result of such compensation according to the embodiment of the invention is illustrated as a curve C in FIG. 1.

The curve D in FIG. 1 indicates the relationship between the aperture value (F value) and the output Pa of the photometric cell at the time an interchangeable lens having a minimum F value of 2.8 is mounted. Usually, the cell output Pa produced on exposure measurement at the open aperture when the interchangeable lens is mounted is different from that when the reference lens is mounted, by an open-aperture measurement error Wvi. Therefore, when an interchangeable lens is mounted, no accurate exposure control would be achieved unless the open-aperture measurement error Wvi were compensated for. In the embodiment of the invention, the open-aperture measurement error Wvi is compensated for to effect automatic exposure adjustment on exposure measurement at the open aperture. A result of such error compensation is indicated as E in FIG. 1.

The open-aperture measurement error Wvi is increased when the aperture is fully opened, but is reduced as the aperture is stopped down by the preview mechanism. That is, as the aperture is stopped down, the outputs produced by the photometric cell at the time of changing lenses are rendered more uniform. In the present embodiment, the open-aperture measurement error Wvi is compensated for upon exposure measurement at the open aperture, and the preview compensation value ΔPv is corrected but the open-aperture measurement error Wvi is not compensated for while the preview mechanism is in operation.

The curve F in FIG. 1 shows the result of correction of the preview compensation value ΔPv using an interchangeable lens having a minimum F value of 2.8 and the characteristic curve D. Study of the curve F indicates that at the open aperture, it is better to compensate for the open-aperture measurement error Wvi, but not to correct the preview compensation value ΔPv.

In a camera in which an aperture value when a preview mechanism is operated is stored in a memory, when the power supply battery is detached, the aperture value stored in the memory is erased, and no correct aperture value can be displayed even if the power supply battery is attached again. When the lens is detached while the preview mechanism is in operation, and if the minimum F value of a new lens is different from that of the detached lens, the aperture diameter is varied even if an aperture presetting lever remains positionally unchanged, and the stored aperture value becomes useless. When the preview mechanism is operated, the aperture presetting lever on the camera body is moved a certain number of steps and then stopped. Since the minimum F value is highly likely to be changed by changing lenses, the aperture value set for a newly mounted lens tends to differ from the aperture value reached by the preview mechanism for the detached lens even by stopping down the aperture of the newly mounted lens through the same number of steps as that for the detached lens.

According to the embodiment of the present invention, when the power supply battery or the lens is detached even once, a display message indicating that the lens is not mounted is displayed to give the camera user a warning.

In case a zoom lens with its minimum F value variable with zooming is mounted, when zooming is effected while the preview mechanism is in operation, it is desirable for the displayed aperture value to vary since the F value varies with zooming. According to the present embodiment, an aperture extent (hereinafter referred to as a zoom F No. deviation) DAvz which corresponds to an aperture value varied with zooming when the preview mechanism is operated, and an aperture value (hereinafter referred to as a preview F value) AVpv at the time the preview mechanism is operated are subjected to the following calculation:

$$AVpv - DAvz = PAv \tag{1}$$

The value PAv is stored in a memory as a maintained preview aperture value. An aperture value Av to be displayed during operation of the preview mechanism is calculated by:

$$PAv + DAvz = Av \tag{2}$$

The F value dependent on the value Av is displayed, so that the aperture value Av displayed during operation of the preview mechanism can be changed for a variation in the zoom F No deviation DAvz which is caused by zooming.

Assuming that the APEX value of sensitivity of the loaded film is indicated by Sv, the APEX value of the brightness according to the output of a photometric cell by Bv, and the APEX value of a calculated shutter speed by Tv, since exposure calculation during operation of the preview mechanism is calculated at the stopped down aperture, the shutter speed Tv determined by calculation is expressed by:

$$Bvo + Sv = Tv \tag{3}$$

where Bvo is the brightness according to the output of the photometric cell. Therefore, the brightness Bvo changes to an extent commensurate with a variation in the F value due to zooming, and the change in the brightness causes a change in the calculated shutter speed Tv.

When the AE lock mechanism is operated during operation of the preview mechanism, the brightness at the instant the AE lock mechanism is operated is measured by TTL light measurement and stored. Consequently, even if the F value is varied by subsequent zooming resulting in a change in the amount of light on the film surface, the brightness value Bvo for use in calculation remains unchanged. Since the calculated shutter speed Tv is not changed by zooming, therefore, no correct exposure control can be carried out. According to the present embodiment, when the AE lock mechanism is actuated while the preview mechanism is in operation, the zoom F No deviation DAvz at the instant the AE lock mechanism is operated is stored as an AE lock deviation DAvz1, and the calculated shutter speed Tv is corrected by using the difference between the AE lock deviation DAvz1 and the zoom F No. deviation DAvz upon completion of zooming. Thus the shutter speed Tv is corrected to an extent commensurate with the variation in the F value caused by zooming, for thereby effecting correct exposure control. This process can be expressed by the following equation:

$$Bvo + Sv + (DAvz1 - DAvz) = Tv \qquad (4)$$

Display and exposure control is performed by using the shutter speed Tv determined by the above equation (4).

Assuming that the minimum F value of the mounted lens is expressed as Avoz, when the AE lock mechanism is actuated during exposure measurement at the open aperture, Bvo+Avoz indicated by:

$$Bvo + Avoz + Sv = Ev = Tv + Av \qquad (5)$$

that is, the measured value Bv obtained through TTL light measurement on exposure measurement at the stopped down aperture, is stored since Bv=Bvo+Avoz.

When the preview mechanism is operated, however, the following calculation at the stopped down aperture:

$$Bvo + Sv = Tv \qquad (6)$$

is effected. If Bvo, i.e., the cell output indicative of light through the wide open aperture is stored, then an error is caused with respect to the shutter speed according to the difference between the aperture value Av and the minimum F value Avoz upon operation of the preview mechanism, as is apparent from comparison of the equations (5) and (6).

In the present embodiment, operation of the preview mechanism is inhibited while the AE lock mechanism is being actuated, so that the measured value at the open aperture is not involved in the calculation at the stopped down aperture while the preview mechanism is being operated. If the preview mechanism is to be operated while the AE lock mechanism is in operation, then light may be measured again after the aperture is stopped down, and that measured value may be stored.

When the AE lock mechanism is actuated while the preview mechanism is in operation, the cell output indicative of light through the stopped down aperture is stored, and an error will be produced by using this stored value for the calculation for exposure measurement at the open aperture after the preview mechanism has been released. In order to prevent the measured value at the stopped down aperture from being involved in the calculation for exposure measurement at the open aperture, when releasing the preview mechanism while the AE lock mechanism is in operation, light is measured again at the open aperture after the preview mechanism is released, and that measured value is stored.

Figure 2:
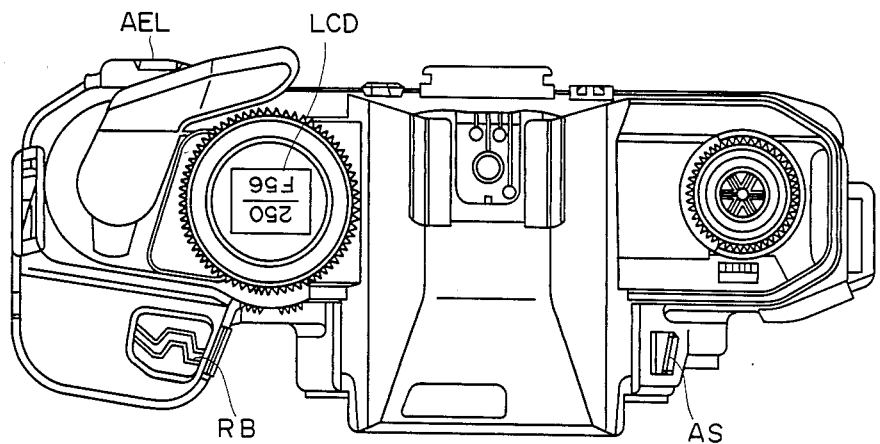
FIG. 2 is a plan view of a camera body according to an embodiment of the present invention.
Figure 3:
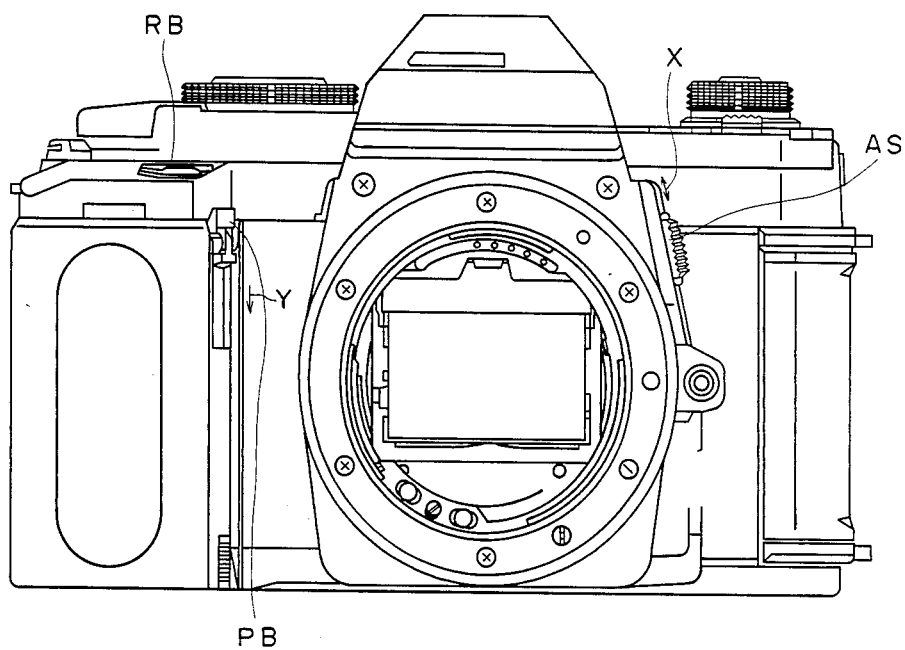
FIG. 3 is a front elevational view of the camera body of FIG. 2.

FIG. 2 is a plan view of a camera body according to the embodiment of the present invention, and FIG. 3 is a front elevational view of the camera body. The camera of the present embodiment has various modes such as an aperture-priority automatic shutter speed control mode, a shutter-speed-priority automatic aperture control mode, a programmed automatic exposure control mode, and a manual exposure control mode. An aperture or shutter speed to be preset can be increased or reduced by moving a setting lever AS in the direction of the arrow X in FIG. 3. The aperture and the shutter speed that have been preset are displayed on a liquid crystal display LCD. When a manually operable AE lock button AEL is pushed, the measured value of light obtained through TTL light measurement at the time is stored in a memory in the camera body, resulting in so-called AE lock. Designated at RB is a shutter release button, and PB a preview button normally urged to return to the illustrated position. When the preview button PB is pressed in the direction of the arrow Y in FIG. 3, a preview mechanism is operated to stop the aperture down to the preset aperture value. When the preview button PB is released while the preview mechanism is in operation, the preview mechanism is released to cause the aperture to return to the open position.

Figure 4A:
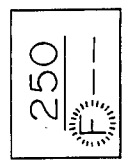
FIGS. 4(A) through 4(D) are views of display patterns according to an embodiment of the present invention.
Figure 4B:
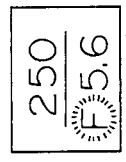
Figure 4C:
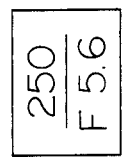
Figure 4D:
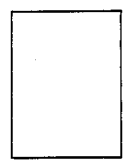

FIGS. 4(A) through 4(D) show display patterns or messages on the liquid crystal display LCD in the aperture—priority automatic shutter speed control mode. The display in FIG. 4(A) is indicative of no display message. The display in FIG. 4(B) is indicative of a display message on exposure measurement at the open aperture while the preview mechanism is not in operation, the display message including a preset or calculated aperture value and shutter speed value. The display in FIG. 4(C) is indicative of a display message on exposure measurement at the stopping down aperture while the preview mechanism is in operation, the display message including a preset or calculated aperture and shutter speed with the mark "F" for the aperture flickering at a constant period. FIG. 4(D) indicates a display message when the lens or battery is detached even once while the preview mechanism is in operation, the display message including the flickering mark "F" without any aperture value displayed.

Figure 5:
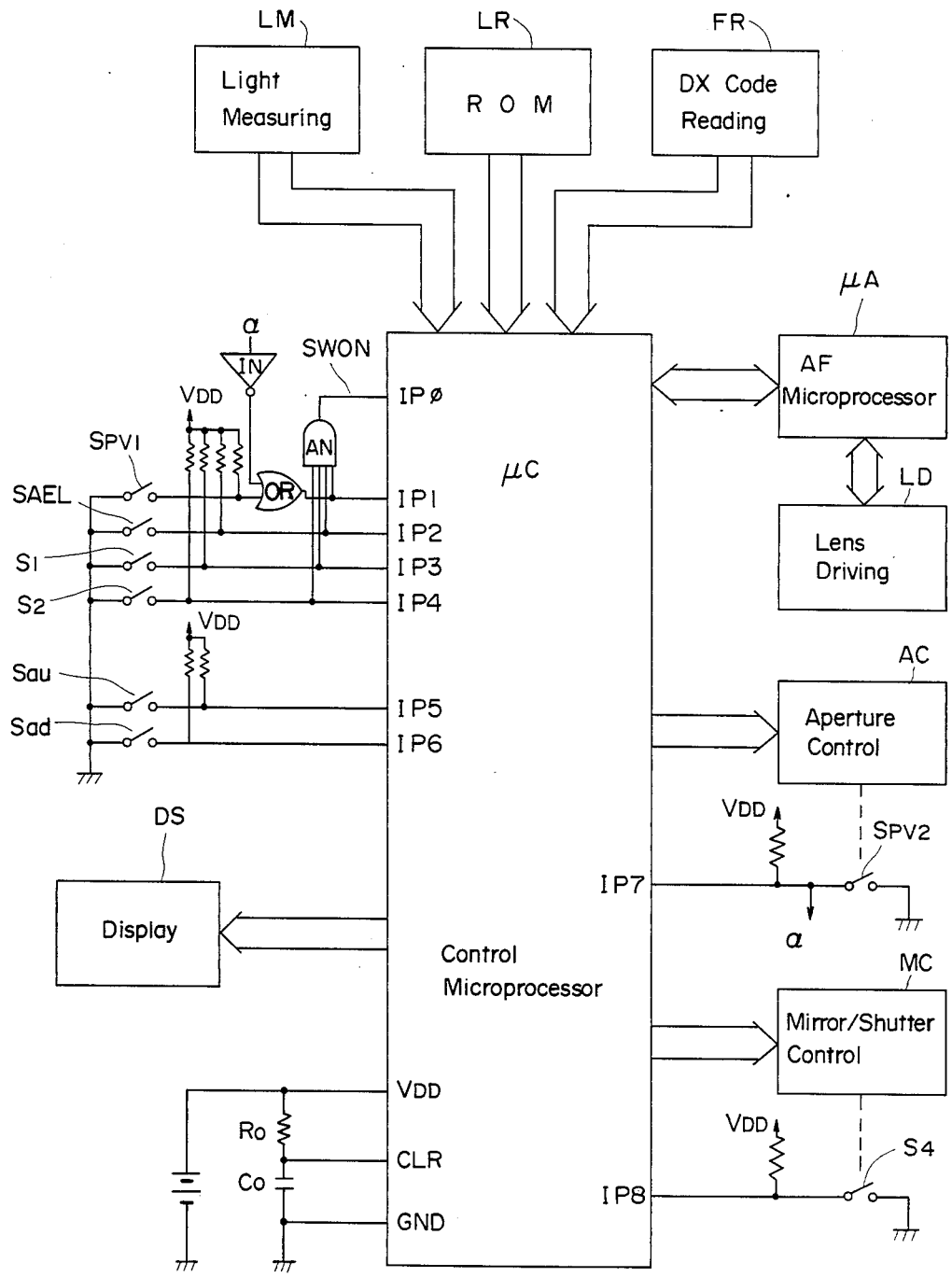
FIG. 5 is a circuit diagram of an electric circuit according to an embodiment of the present invention.

An electric cicuit of the camera of the present embodiment is illustrated in FIG. 5. For the sake of brevity, operation in the aperture-priority automatic shutter speed control mode or the manual exposure control mode will be described. Designated at $\mu C$ is a control microprocessor for controlling all sequences related to exposure control for the camera. The control microprocessor $\mu C$ has input ports IP0 through IP8 and a reset terminal CLR. When the positive edge of a pulse is applied to the input terminal CLR, the control microprocessor $\mu C$ executes a given program from its start. A resistor Ro and a capacitor Co jointly constitute a power-up clear circuit which makes the terminal CLR low instantaneously when a power supply battery is connected to the control microprocssor $\mu C$. All resistors other than the resistor Ro are pull-up resistors.

A light measuring unit LM transmits a measured value of light that has passed from an object through a lens to the control microprocessor $\mu C$. Denoted at LR is a ROM (read-only memory) contained in the lens for transmitting lens information (described later) to the control microprocessor $\mu C$.

A DX code reader FR reads film sensitivity information electrically recorded on the cartridge of the loaded film, and transmits the information to the control microprocessor $\mu C$.

An AF microprocessor $\mu A$ for automatic focus adjustment for the lens effects focus detecting and drives the lens. A lens driver LD is controlled by the AF microprocessor $\mu A$ for driving the lens.

An aperture control unit AC serves to control the aperture as it is stopped down when the shutter is released or the preview mechanism is operated. An aperture detector switch Spv2 is closed when the aperture is driven, and is opened when the preview mechanism is released by releasing the preview lever PB, or when the charging of an aperture presetting system is completed by film winding after the shutter is released.

A mirror/shutter control unit MC controls up/down movement of the mirror when the shutter is released and also controls first and second curtains of a focal plane shutter. A winding-completion detector switch S4 is opened upon completion of film winding by one frame and is closed upon completion of travel of the second shutter curtain. A display device DS displays on the liquid crystal display LCD of FIG. 2 a preset aperture and a shutter speed calculated according to the result of light measurement.

Designated at Spv1 is a preview starter switch which is closed by depressing the preview lever PB, SAEL an AE lock switch which is closed by depressing the AE lock button AEL, S1 an AF starter switch which is closed by pressing the shutter release button RB in order to enable the AF microprocessor μA to start automatic focusing operation, and S2 a release switch which is closed by pressing the shutter release button RB.

The above four switches Spv1, SAEL, S1, S2 serve as light measurement starter switches and are connected to the input terminals of an AND gate AN. AND gate AN produces as an output signal a light measurement starting signal SWON. When at least one of the above four switches is closed, the light measurement starting signal SWON goes low. An OR gate OR has one input terminal connected to the preview starter switch Spv1 and the other input terminal to the aperture detector switch Spv2 through an inverter gate IN. The function of the OR gate is that when the aperture detector switch Spv2 is closed, i.e., when the aperture is stopped down or the film winding is not completed after the shutter is released, the preview starter switch Spv1 is not connected to the control microprocessor μC in order to prevent the preview mechanism from being operated. Denoted at Sau, Sad are switches which are opened and closed in response to movement of the setting lever AS for increasing and reducing the preset aperture value. The preset aperture value can be changed by closing these switches Sau, Sad.

Figure 6:
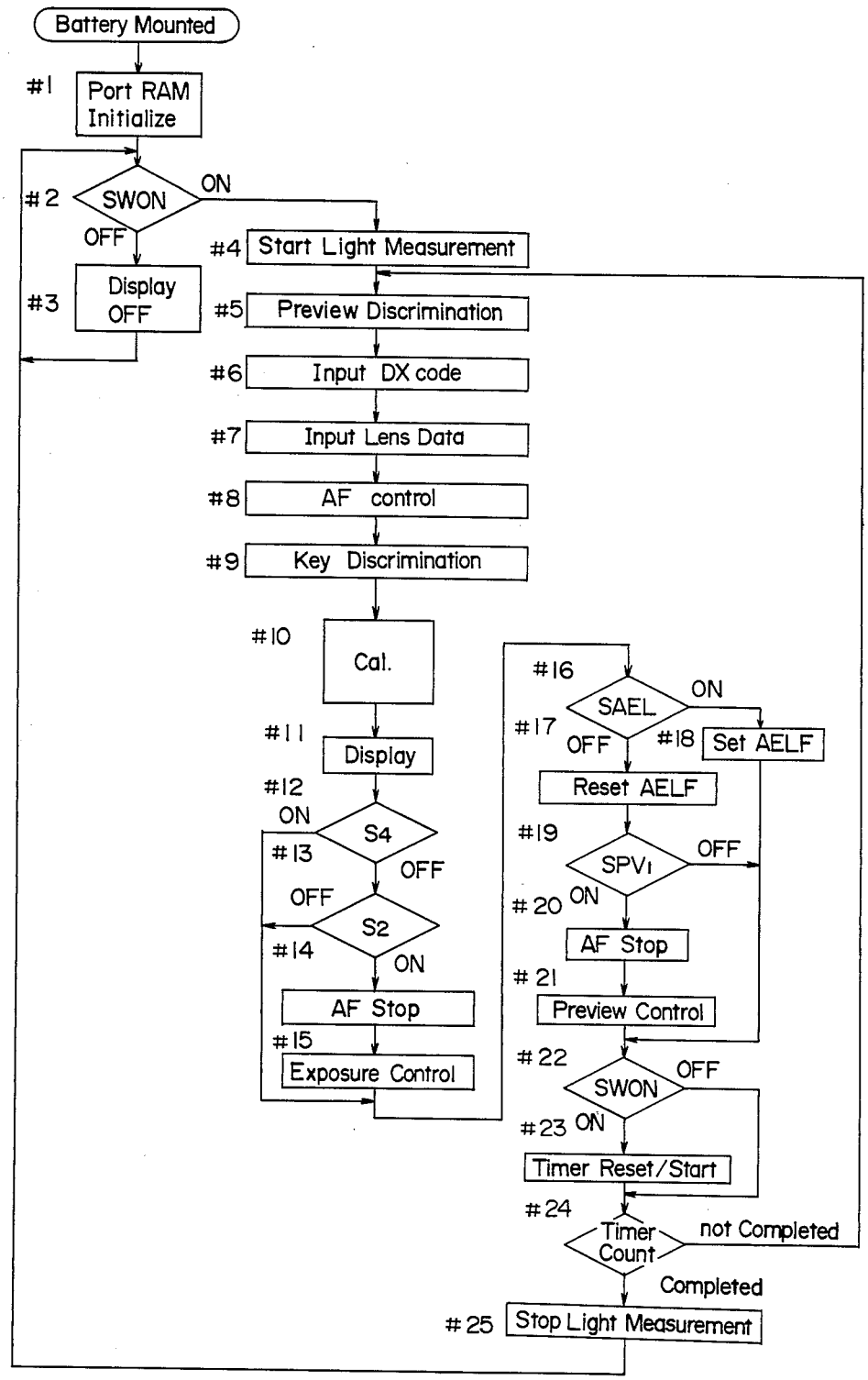
FIG. 6 is a flowchart of an operation sequence of the electric circuit.

When the power supply battery is mounted on the camera, the control microprocessor μC starts executing the program. FIG. 6 is a flowchart of an operation sequence according to the present invention. Operation of the embodiment will be described below with reference to the flowchart of FIG. 6.

When the battery is mounted, the control microprocessor μC initializes all of its ports and its RAM in a step #1. At this time, in order to indicate that the lens is not mounted as the display of an aperture value, the maintained preview aperture value PAv is set at "0". When the preview mechanism is operated, the value obtained by subtracting the zoom F No deviation DAvz at the time from the aperture value Av to be achieved is stored as the maintained preview aperture value PAv. When displaying the aperture value, the sum of this maintained preview aperture value PAv and the present zoom F No. deviation DAvz is displayed as the aperture value Av. With this process, the displayed aperture value can be changed with the zooming even if the aperture diameter remains fixed during operation of the preview mechanism. By setting the maintained preview aperture value PAv to "0" at this time, the displayed aperture value Av becomes "0" as described later on and the aperture value is displayed as shown in FIG. 4(D).

When the battery is mounted, the maintained preview aperture value PAv has not be stored in the memory. Therefore, the maintained preview aperture value PAv is initially set as "0", and the display of FIG. 4(D) is made while the preview mechanism is in operation. In a step #2, the control microprocessor monitors the light measurement starter signal SWON to ascertain whether at least any one of the four light measurement starter switches is turned on or not. If all of the four light measurement starter switches are turned off at this time, the program goes to a step #3 in which the display is de-energized, and then returns to the step #2 to wait for the light measurement starter signal SWON to be "ON".

If the light measurement starter signal SWON is "ON" in the step #2, then the program proceeds to a step #4 to start light measurement. Thereafter, a step #5 ascertains whether the preview mechanism is in operation or not. In a step #6, a DX code relating to the film sensitivity which is read by the DX code reader FR is entered. If there is a DX code signal, it is converted to the APEX value Sv of film sensitivity. If there is no DX code signal, then ISO=100 is stored as the APEX value Sv. Then, information such as the minimum F value Avoz for the lens is entered in a step #7 from the ROM LR on the mounted lens, and automatic focusing operation is effected in a step #8. A next step #9 finds how the up/down switches Sau, Sad are set, and determines a preset aperture value AvSET.

Thereafter, the microprocessor μC effects, in a step #10, exposure calculation based on the above information and the measured value Bv entered from the light measurement unit LM to determine a shutter speed value Tv and an aperture value Av for control. These shutter speed value Tv and aperture value Av are displayed in a step #11 on the liquid crystal display LCD of the display device DS. Thereafter, the status of the switches S4, S2 are determined in steps #12, #13, respectively. If the switch S2 is turned on as a result of film winding completion, the automatic focusing operation by the AF microprocessor μA is stopped in a step #14, and exposure control is effected in a step #15 based on the determined shutter speed and aperture values.

A step #16 determines how the switch SAEL is set. If the switch SAEL is turned on by the operation of the AE lock button AEL, then an AE lock flag AELF indicating that the AE lock mechanism is actuated is set in a step #18. If the switch SAEL is turned off in the step #16, then the AE lock flag AELF is reset in a step #17, and the status of the switch Spv1 which is closed by pressing the preview button PB is determined in a step #19. While the AE lock mechanism is in operation, the program proceeds from the step #16 to the step #18 while skipping the step #19, so that operation of the preview mechanism is inhibited.

If the switch Spv1 is turned on in the step #19, the automatic focusing operation is stopped in a step #20, followed by a step #21 in which stopping down of the aperture is controlled for depth of field preview. In the present embodiment, the present zoom F No deviation DAvz is subtracted from the aperture value Av to provide the maintained preview aperture value PAv. Since the preview mechanism is the same as the mechanism for stopping down the aperture when releasing the shutter according to the present embodiment, it is impossible to operate the preview mechanism when the film winding is not completed and the aperture presetting system is not charged. In this case, inasmuch as the switch Spv2 is turned on, the switch Spv1 is disconnected by the OR gate OR from the control microprocessor μC. Therefore, even if the status in which the switch Spv1 is set is determined, the control microprocessor μC will not enter an uncessary preview control mode.

Then, the control microprocessor μC ascertains in a step #22 whether the light measurement starter signal SWON is ON or OFF. If any of the four light measurement switches is turned on, the control microprocessor μC resets and starts a 10-sec. timer in a step #23. The 10-sec. timer is provided to keep the light measurement condition for 10 seconds even when the four light measurement starter switches are opened.

A step #24 ascertains whether the count of the time is completed or not. If the 10-sec. count is not completed, then the program returns to the step #5 for continued light measurement. If the 10-sec. count is completed, then the light measutement is stopped in a step #25, from which the program returns to the step #2 and then to the step #3 in which the display is de-energized. Then, the program waits for any of the four light measurement starter switches to be turned on.

Figure 7:
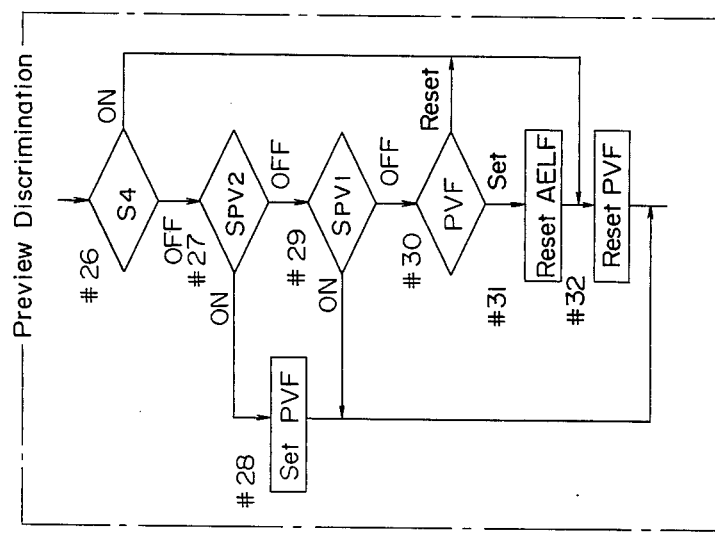

FIG. 7 is a detailed flowchart of the step #5 of FIG. 6 for preview discrimination. A step #26 ascertains whether the switch S4 is turned on or off. If the film winding is not completed and the switch S4 is turned on, then the program goes to a step #32 in which a preview flag PVF indicating that the preview mechanism is in operation is reset. This is because the preview mechanism cannot be in operation since the film winding is not yet completed after the shutter was released. The program also goes to the step #32 to reset the preview flag PVF when the shutter is released while the preview mechanism is being operated and thereafter the preview mechanism is released. If the switch S4 is turned off in the step #26, then the program goes to a step #27 which ascertains whether the switch Spv2 is turned on or off. If the switch Spv2 is turned on, then the preview flag PVF is set in a step #28 since the aperture is stopped down. If the switch Spv2 is turned off, then the program proceeds to a step #29 which ascertains whether the switch Spv1 is turned on or off.

If the switch Spv2 is turned off in the step #27 and the switch Spv1 is turned on in the step #29, the preview lever PB has slightly been depressed for startihg the preview mechanism, or the preview lever PB is on its way back up after the presetting system has been recharged (the switch Spv2 is now turned off) by deeply depressing the preview lever PB for releasing the preview mechanism. Therefore, the program goes from the step #29 to the step #6 of FIG. 6. If the switch Spv1 is turned off in the step #29, then the program goes to a step #30 which ascertains whether the preview flag PVF is set or reset.

If the preview flag PVF is reset, the switches S4, Spv2, Spv1 are turned off in the steps #26, #27, #29, i.e., the film winding has been completed and nothing has been done for preview. The program may go on without doing anything. In the present embodiment, however, the program proceeds to a step #32 to reset the preview flag PVF again since no problem would be caused by resetting again the preview flag PVF that has been reset.

If the preview flag PVF is set in the step #30 and in view of the fact that the switches S4, Spv2, Spv1 are all turned off, the program enters the preview discriminating routine only after the preview mechanism is released. To provide for the operation of the AE lok mechanism while the preview mechanism is in operation, a step #31 resets the AE lock flag AELF in preparation for measuring light again, and thereafter the preview flag PVF is reset in the step #32.

Figure 8:
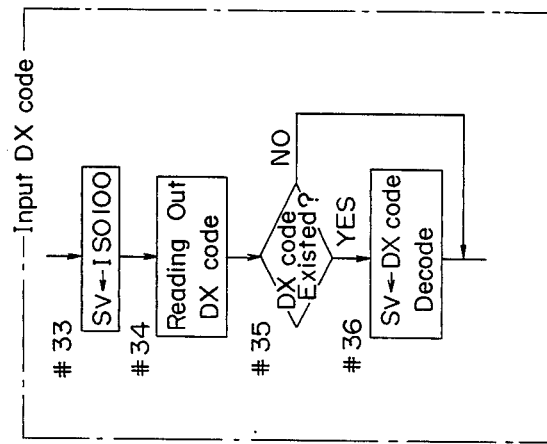
FIGS. 7 through 11 and FIG. 15 are flowcharts of detailed operations of the operation sequence.

FIG. 8 is a detailed flowchart of the step #6 in FIG. 6 for entering a DX code. In a step #33, the film sensitivity value Sv is set to ISO=100. In a step #34, the DX code relating to the film sensitivity is read from the DX code reader FR. Then, a step #35 ascertains whether there is a DX code or not. If there is no DX code, the program leaves this routine, and hence the film sensitivity Sv remains to be ISO=100. If there is a DX code in the step #35, then it is decoded in a step #36 to rewrite the film sensitivity value Sv.

Figure 9:
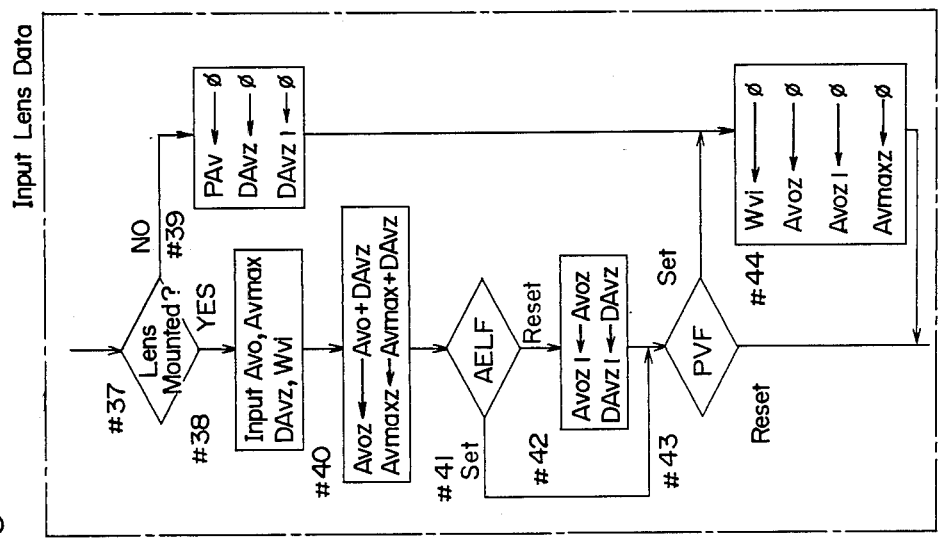

FIG. 9 is a detailed flowchart of the step #7 in FIG. 6 for entering lens information. A step #37 ascertains whether a lens is mounted on the camera body or not. If a lens is mounted, then the program proceeds to a step #38 in which a minimum F value Avo, a maximum F value Avmax, a zoom F No deviation DAvz, and an open aperture measurement error Wvi are entered from the ROM LR of the lens.

Then, the open F value Avo and the zoom F No deviation DAvz transmitted from the lens are added, and the sum is regarded as a calculated open F value Avoz indicative of the open F value in the present zooming position in a step #40. Also in the step #40, the maximum F value Avmax and the zoom F No deviation DAvz are added, and the sum is regarded as a calculated maximum F value Avmaxz indicative of the maximum F value in the present zooming position. Then, a step #41 ascertains whether the AE lock flag AELF is set or reset. If the AE lock flag AELF is reset, i.e., if the AE lock mechanism is not in operation, the present calculated open F value Avoz and the zoom F No deviation DAvz are maintained as Avoz1 and DAvz1, respectively, in a step #42. Therefore, when the AE lock mechanism is operated, these Avoz1 and DAvz1 are no longer updated, and the calculated open F value Avoz and the zoom F No deviation DAvz at the time the AE lock button AEL is pressed are stored.

The calculated open F value Avoz is stored when the AE lock mechanism is operated. The reason is that since the brightness Bv is the sum of the brightness Bvo on exposure measurement at the open aperture and the calculated open F value Avoz, and in view of the fact that the open F value is varied by zooming on exposure measurement at the open aperture, the amount of exposure control would be varied only by storing the brightness Bvo on exposure measurement at the open aperture through operation of the AE lock mechanism. The zoom F No. deviation DAvz is stored on operation of the AE lock mechanism in order to prevent the amount of exposure control from changing upon zooming during operation of the AE lock mechanism while the preview mechanism is in operation.

A next step #43 ascertains whether the preview flag PVF is set or reset. If it is set, then the program goes to a step #44 in which Wvi is set to "0" so as not to compensate for the open aperture measurement error Wvi during operation of the preview mechanism, and the calculated open F values Avoz, Avoz1 and the calculated maximum F value Avmaxz are set to "0" in order to effect calculation at the stopped down aperture.

If a lens is not mounted in the step #37, the program proceeds to a step #39 in which the maintained preview aperture value PAv is set to "0" in order to produce the display pattern of FIG. 4(D) in the case when the lens is detached even once during operation of the preview mechanism as described above, and the zoom F No deviations DAvz, DAvz1 are set to "0" for exposure calculation at the stopped down aperture. The step #39 is then followed by the step #44.

Figure 10:
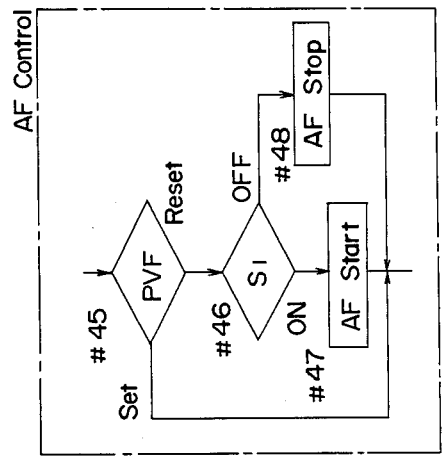

FIG. 10 is a detailed flowchart of the step #8 in FIG. 6 for automatic focusing operation. A step #45 ascertains whether the preview flag PVF is set or reset. If reset, i.e., if the preview mechanism is not in operation, the program goes to a step #46 which ascertains whether the switch S1 is turned on or off. If the switch S1 is turned on, then operation of the automatic focusing mechanism is started in a step #47. If the switch S1 is turned off, the program goes to a step #48 in which the automatic focusing operation is stopped.

If the preview flag PVF is set in the step #45, i.e., if the preview mechanism is in operation, then no automatic focusing operation is carried out. This means that since the automatic focusing operation has already been stopped when the preview mechanism started to operate, no automatic focusing operation is performed even when the switch S1 is turned on during operation of the preview mechanism.

Figure 11:
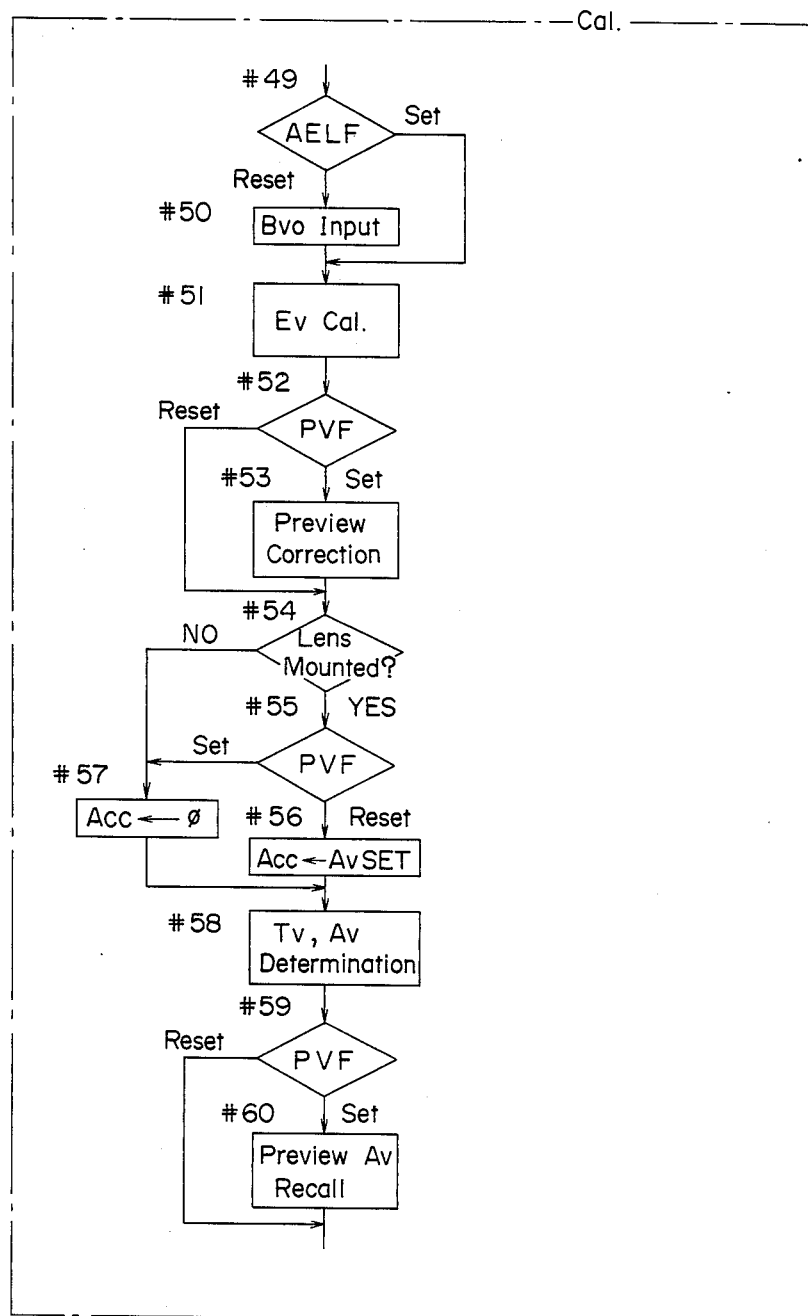

FIG. 11 is a detailed flowchart of the step #10 in FIG. 6 for inputting and calculating the measured value of light. A step #49 ascertains whether the AE lock flag AELF is set or reset. If reset, i.e., if the AE lock mechanism is not operated, the open aperture measured brightness value Bvo is input in a step #50.

Then, a step #51 adds Bvo, Avoz1, Sv, and Wvi to determine an exposure value Ev. Thereafter, a step #52 ascertains whether the preview flag PVF is set or reset. If set, i.e., if the preview mechanism is in operation, a step #53 adds the difference between DAvz1 and DAvz to Ev and substracts a preview compensation value ΔPv therefrom for correcting the exposure value Ev. The difference between DAvz1 and DAvz is added so that the amount of exposure control will not be changed even when zooming is effected while the AE lock mechanism remains operated during operation of the preview mechanism. The preview compensation value ΔPv is subtracted for correcting the exposure value Ev so that the amount of exposur control will be the same on exposure measurements at open and stopped down apertures because of the poor linearity relationship between the output from the TTL light measuring cell and the aperture value.

While the preview compensation value ΔPv is constant in the present embodiment, it may be variable. For example, 1. If the preview compensation value ΔPv is constant, compensation is too excessive under preview conditions in the vicinity of the open aperture as shown in FIG. 1, the preview compensation value ΔPv may be increased or reduced dependent on the preview aperture value.

Figure 12:
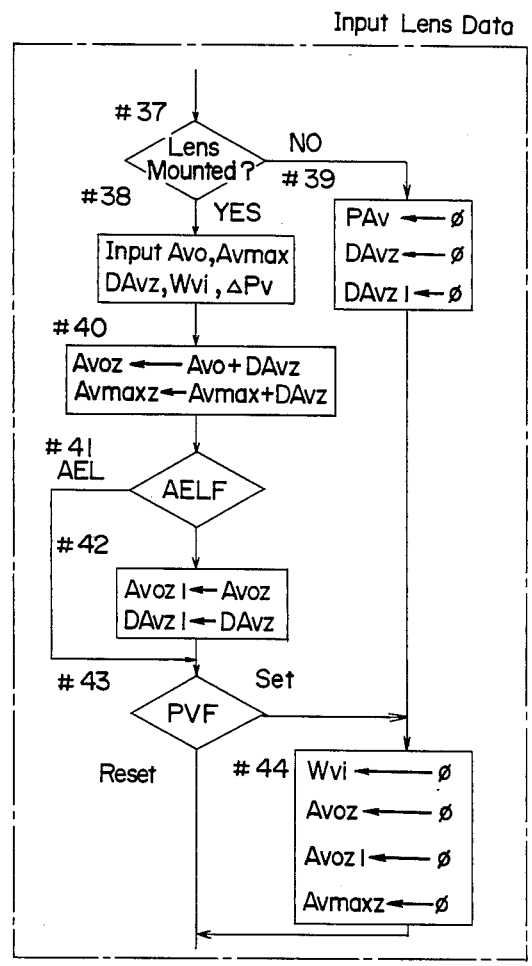
FIG. 12 is a flowchart of a modification of the flowchart of FIG. 9.

2. Since the relationship between the cell output and the aperture varies from lens type to lens type, different preview compensation values ΔPv may be stored in advance in the respective ROMs of lenses, and may be used respectively for those lenses. In this case, the preview compensation value ΔPv is also input from the ROM LR of the lens as indicated in the step #38 shown in FIG. 12.

3. The above examples 1 and 2 may be combined.

4. The preview compensation value ΔPv may not be corrected if the number of steps through which the aperture is stopped down from the open aperture in the preview operation is smaller than a prescribed number (for example, smaller than 0.5 Ev).

Figure 13:
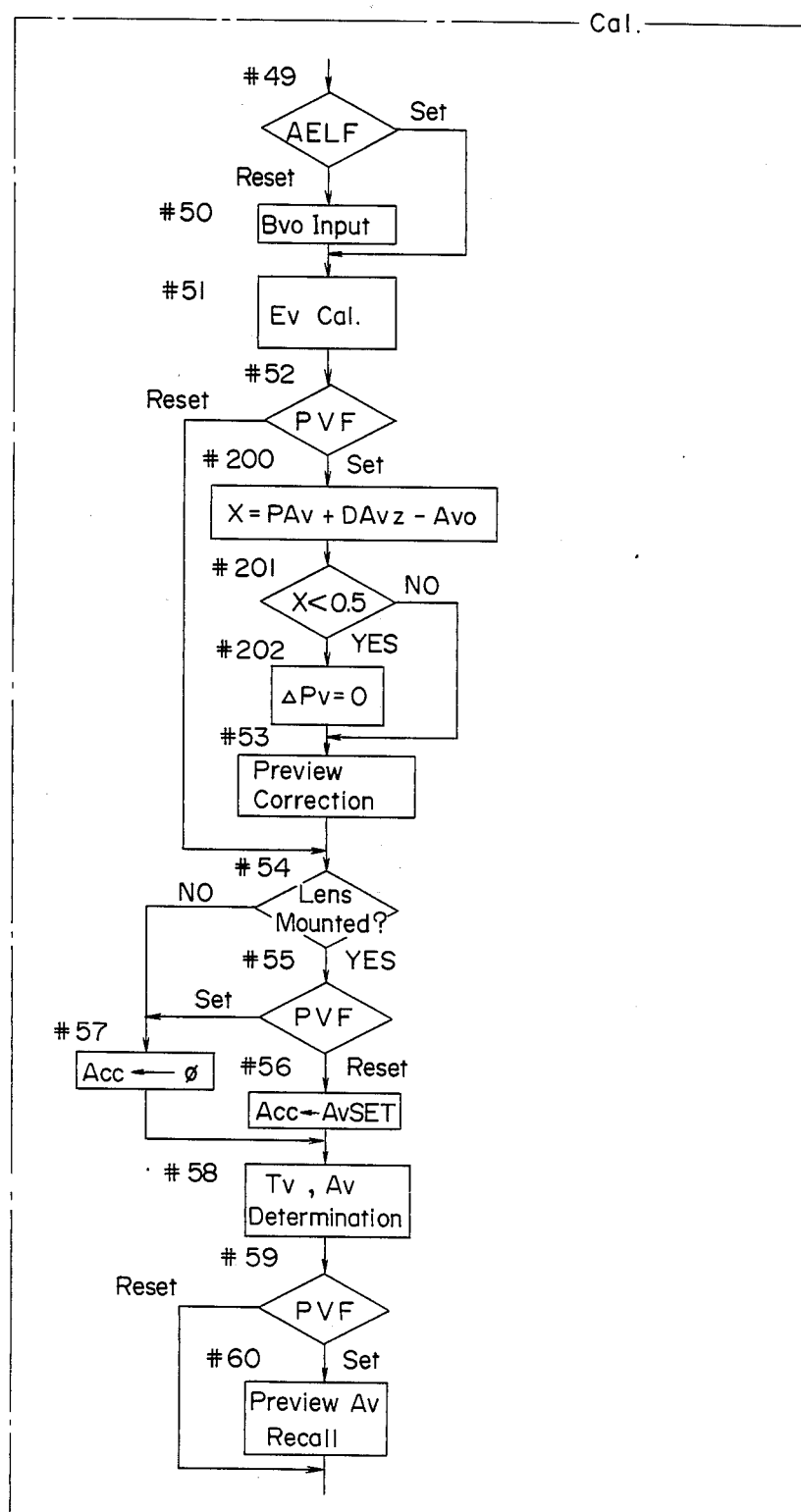
FIGS. 13 and 14 are flowcharts of modifications of the flowchart of FIG. 11.

In the above example 4, a value X is calculated according to the following equation, as indicated in a step #200 in FIG. 13:

$$X = (PAv + DAvz - Avo) \quad (7)$$

If X is smaller than 0.5 in a step #201, then the preview compensation value ΔPv is set to "0" in a step #202. If X is equal to or greater than 0.5, then the program jumps to the step #53.

Figure 14:
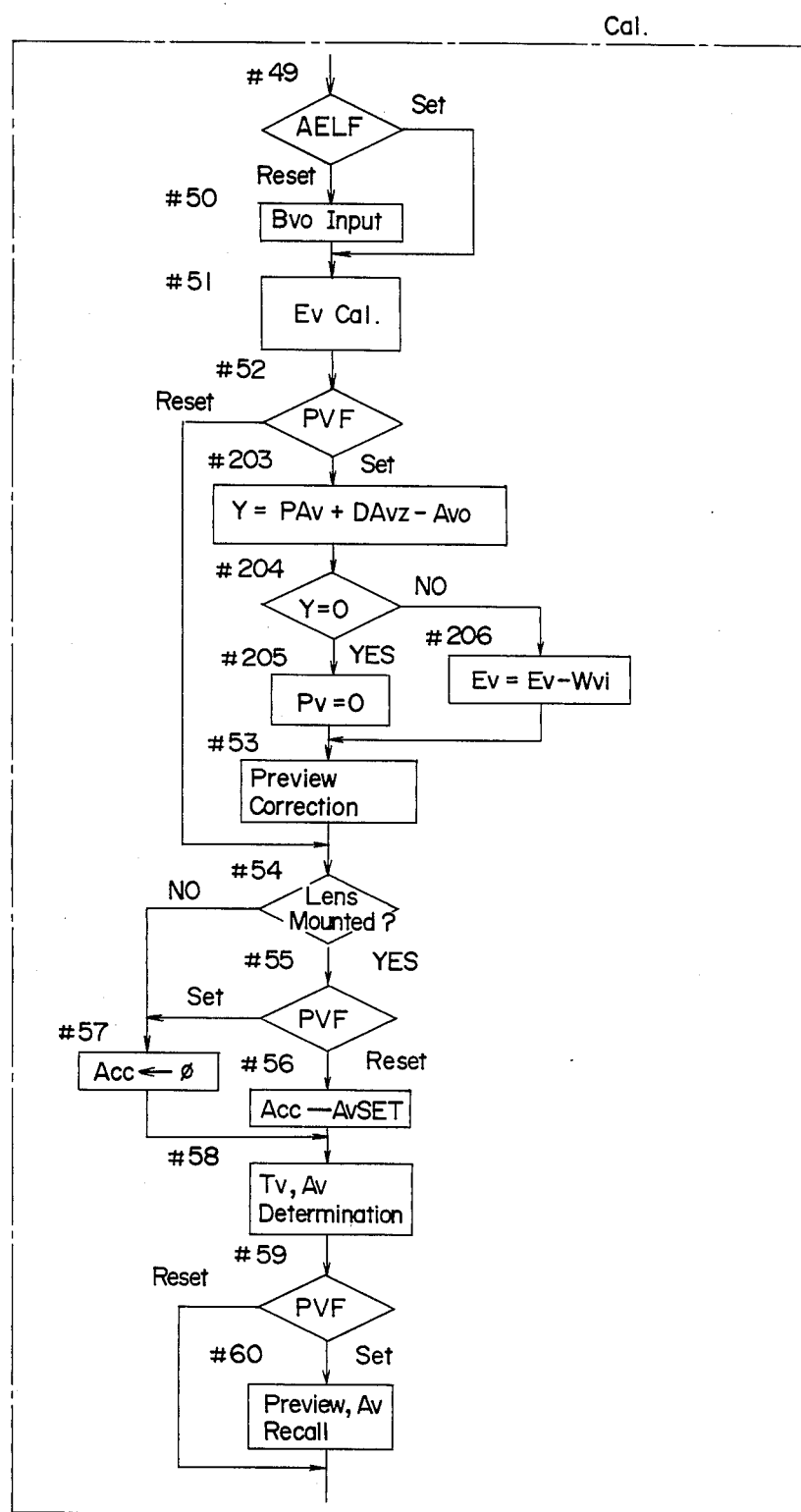

As is apparent from the curve F shown in FIG. 1, there is an open-aperture measurement error Wvi while the preview mechanism is in operation at the open aperture. In this case, only the open-aperture measurement error Wvi may be compensated for, and the preview compensation value ΔPv may not be effected for a smaller exposure calculation error. To this end, a value Y is calculated according to the following equation, as indicated in a step #203 in FIG. 14:

$$Y = (PAv + DAvz - Avo) \quad (8)$$

If Y is "0" in a step #204, then the preview compensation value ΔPv is set to "0" in a step #205. If Y is other than "0", then Wvi is compensated for in a step #206 and the program then goes to the step #53. It is not necessary to set Wvi to "0" in the step #44 in FIG. 9.

Referring back to FIG. 11, a step #54 ascertains whether a lens is mounted on the camera body or not, and a step #55 ascertains whether the preview flag PVF is set or reset. If no lens is mounted or the preview mechanism is in operation, then the program goes to a step #57 in which the content of an accumulator Acc is set to "0". If a lens is mounted and the preview mechanism is not in operation (the preview flag PVF is reset), then the program goes to a step #56 in which a preset aperture value AvSET is placed in the accumulator Acc.

In a step #58, the content of the accumulator Acc is used as Av, and a shutter speed value Tv is determined by subtracting the accumulator value from the calculated Ev. Then, a step #59 ascertains whether the preview flag PVF is set or reset. If the preview mechanism is in operation, then the present zoom F No deviation DAvz is added to the preview aperture value PAv to produce a calculated aperture value Av. This is to allow the aperture value displayed during operation of the preview mechanism to be varied according to zooming. Exposure display and control is effected according to the aperture value Av and the shutter speed value Tv that are determined in the above manner.

Figure 15:
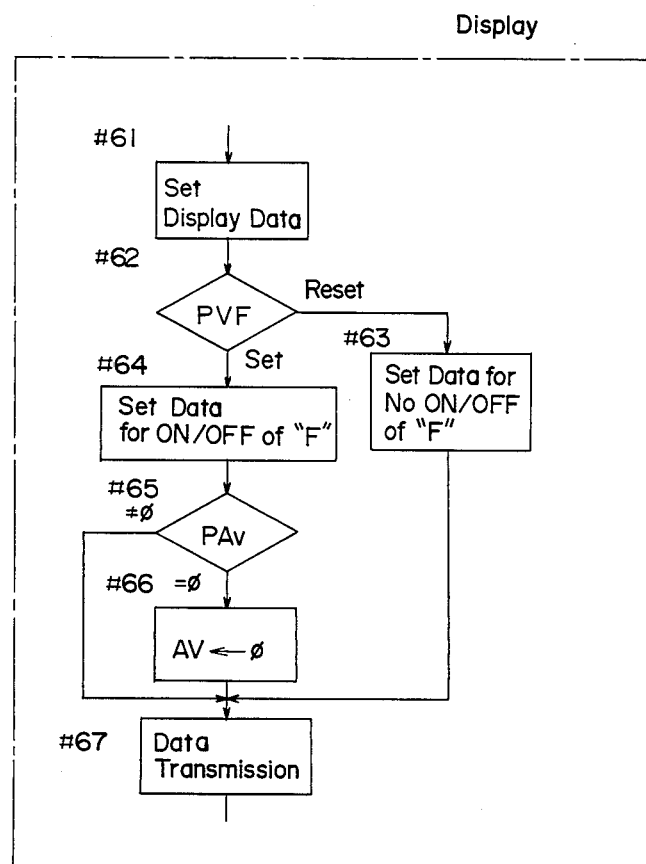

FIG. 15 is a detailed flowchart of the step #11 in FIG. 6 for display. In a step #61, the aperture value Av and the shutter speed value Tv which have been determined in the calculation routine of FIG. 11 are set in a register which transmits them as display data to display device DS. Then, a step #62 ascertains whether the preview flag PVF is set or reset. If this flag is reset, i.e., if the preview mechanism is released, the program goes to a step #63 in which data for preventing the mark "F" from flickering is set in a register which transmits the data to the display device DS.

If the preview flag PVF is set in the step #62, i.e., if the preview mechanism is in operation, a step #64 sets data for allowing the mark "F" to flicker in a register which transmits the data to the display device DS. Then, a step #65 determines if the maintained preview aperture value PAv is "0" or not. If the maintained preview aperture value PAv is "0", then the program proceeds to a step #66 in which data on the aperture value to be transmitted to the display device DS is set to "0". This is to display the aperture value as shown in FIG. 4(D) since the fact that the preview mechanism is in operation and the maintained preview aperture value PAv was "0" means that the lens is dismounted once or the battery was detached while the aperture was stopped down with the preview mechanism in operation. When the data indicating that the aperture value Av is "0" is transmitted to the display device DS, the display device DS displays the aperture value as shown in FIG. 4(D). The display pattern may be such that other messages than the aperture value being used, such as "00" or "99", may be displayed, or the displayed aperture value may be caused to flicker, or no aperture value may be displayed at all. Thereafter, the program goes to a step #67 which transmits the display data thus set from the control microprocessor μC to the display device DS. The display device DS now displays the aperture value Av and the shutter speed value Tv, and turns on or flickers the mark "F".

In the embodiment of the present invention, the data of the preview compensation value ΔPv is stored in the ROM of the lens. However, the present invention is not limited to such an arrangement, but many ΔPv data items may be stored in the camera body, and one of such stored data items which corresponds to a lens type used may be selected in response to a signal indicative of the lens type.

Figure 16:
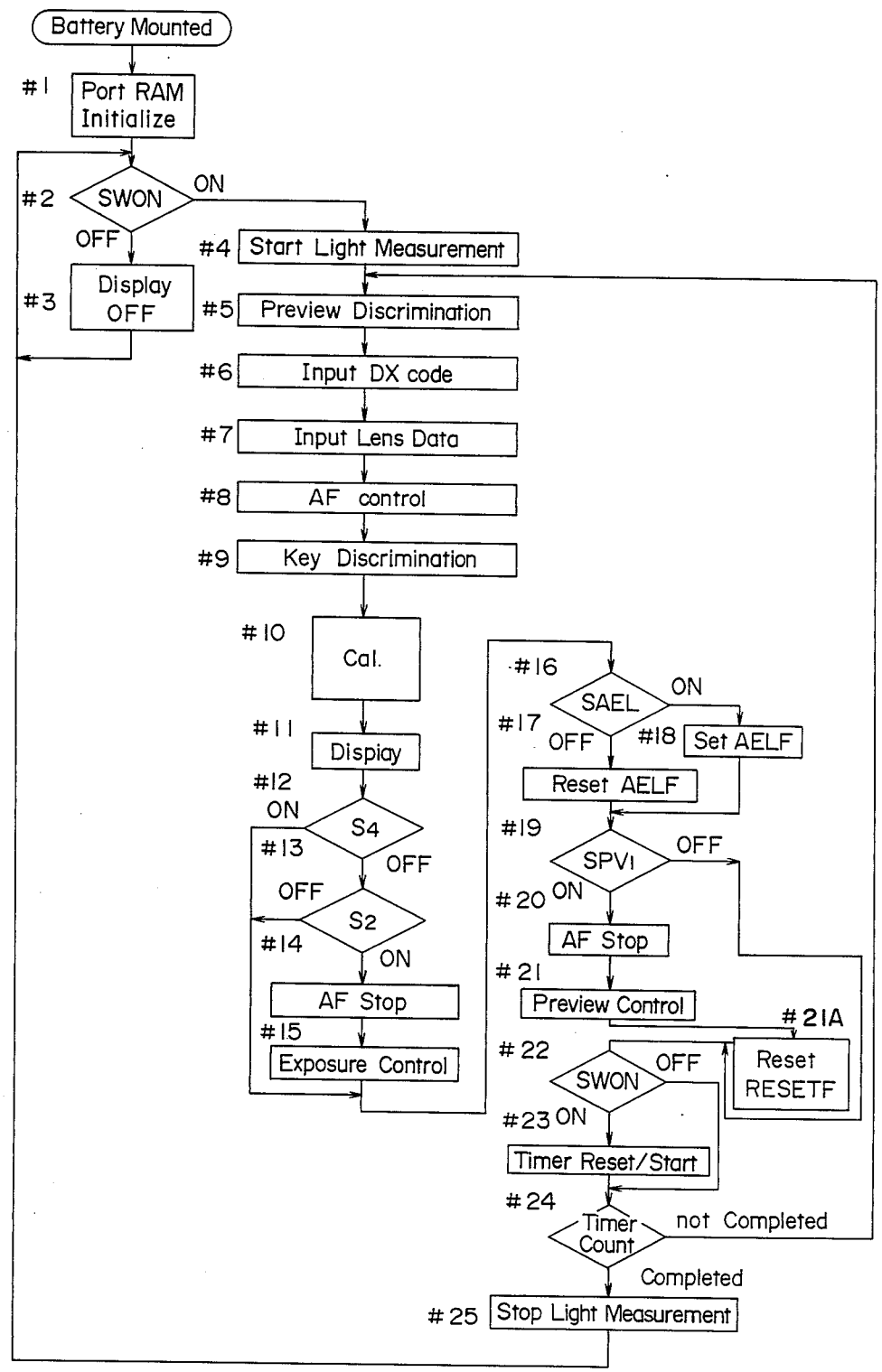
FIGS. 16 and 17 are flowcharts of a modification of the embodiment of the present invention.

In the foregoing embodiment, it is not possible to operate the preview mechanism to stop down the aperture while the AE lock mechanism is in operation. FIG. 16 shows a flowchart of an operation sequence for enabling the preview mechanism to operate while the AE lock mechanism is in operation. The flowchart of FIG. 16 is a modification of the flowchart of FIG. 6.

The flowchart of FIG. 16 differs from the flowchart of FIG. 6 in that if the AE lock switch SAEL is turned on in the step #16 and when the AE lock flag AELF is set in the step #18, the program goes to the step #19 to ascertain if the preview switch Spv1 is turned on or off, rather than jumping to the step #22 as shown in FIG. 6. In this modification, after the preview control has been effected in the step #21, a reset flag RESETF is reset in a step #21A as described later.

Figure 17:
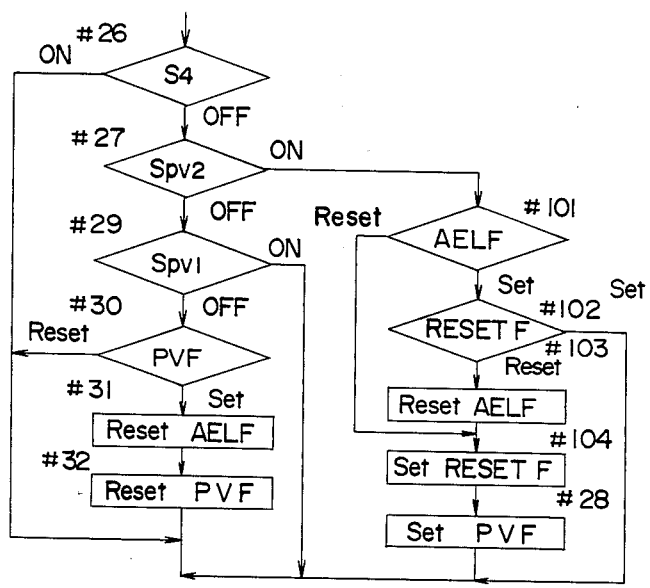

FIG. 17 shows a flowchart (corresponding to the flowchart of FIG. 7) of preview discrimination in this modification. If the aperture detector switch Spv2 is turned on in the step #27, the program goes to step #101 which ascertains whether the AE lock flag AELF is set or reset. If the AE lock flag AELF is reset, the program jumps to a step #104 in which the reset flag RESETF is set, followed by the step #28 in which the preview flag PVF is set. Then, the program goes to the next operation sequence for entering a DX code. If the AE lock flag AELF is set in the step #101, then the program proceeds to a step #102 which ascertains whether the reset flag RESETF is set or reset. When the preview mechanism is to be operated after the AE lock mechanism has been actuated, the reset flag RESETF serves to reset the AE lock flag AELF once to store the measured value of light while the preview mechanism is in operation. If the reset flag RESETF is reset in the step #102, the program goes to a step #103 in which the AE lock flag AELF is reset. Then, the reset flag RESETF is set in a step #104, and the program goes to the step #28. If the reset flag RESETF is set in the step #102, the preview mechanism and the AE lock mechanism have been operated, and the program goes to the next operation sequence for entering a DX code. With this arrangement, the preview mechanism can be operated while the AE lock mechanism is in operation.

Operation in the aperture-priority automatic shutter speed control mode or the manual exposure control mode has been described. Similarly, in the shutter-speed-priority automatic aperture control mode and the programmed automatic exposure control mode, aperture values may be determined through respective calculations, and the preview mechanism may be operated, or exposure calculation or exposure control may be effected, on the basis of the determined aperture values.

What is claimed is:

1. A camera system including a camera body and an objective lens for photographing, mountable on the camera body, comprising:
   a preview operating member;
   a release operating member;
   means for starting an exposure operation of the camera system in response to operation of the release operating member;
   means for stopping down an aperture diaphragm of the objective lens to a predetermined aperture value in response to operation of the preview operating member;
   means for discriminating whether the stopping down operation is being performed;
   means for measuring light transmitted through the objective lens to produce a light measuring signal relative to the measured light;
   means for correcting the light measuring signal in accordance with a difference between a light measuring signal measured when the aperture diaphragm is fully opened and a light measuring signal measured when the aperture diaphragm is stopped down by the stopping down means; and
   means for controlling the correcting means to operate the correcting means when the discriminating means detects that the stopping down operation is being performed.

2. The camera system as claimed in claim 1, wherein the correcting means includes means for storing a constant value as the difference.

3. The camera system as claimed in claim 1, wherein the correcting means includes means for determining the difference in accordance with a type of objective lens attached to the camera body.

4. The camera system as claimed in claim 3, wherein the correcting means includes means for storing the difference in the objective lens.

5. The camera system as claimed in claim 4, wherein the difference storing means is a read only memory provided in the objective lens.

6. The camera system as claimed in claim 1, wherein the correcting means includes means for determining the difference in accordance with an aperture value set in the objective lens.

7. The camera system as claimed in claim 1, further comprising:
  means for compensating the light measuring signal in accordance with a differnece between a light measuring signal measured when a predetermined reference lens is attached to the camera body and a light measuring signal measured when the objective lens for photographing is attached thereto.

8. The camera system as claimed in claim 1, wherein the discriminating means includes means for discriminating whether the preview operating member is being operated or not.

9. A camera system including a camera body and an objective lens for photographing, mountable on the camera body, comprising:
  a preview operating member;
  a release operating member;
  means for starting an exposure operation of the camera system in response to operation of the release operating member;
  means for stopping down an aperture diaphragm of the objective lens to a predetermined aperture value in response to operation of the preview operation member;
  means for discriminating whether the stopping down operation is being performed;
  means for measuring light transmitted through the objective lens to produce a light measuring signal relative to the measured light;
  means for compensating the light measuring signal in accordance with a difference between a light measuring signal measured when a predetermined reference lens is attached to the camera body and a light measuring signal measured when the objective lens for photographing is attached thereto; and
  means for controlling the compensating means responsive to the discriminating means.

10. The camera system as claimed in claim 9, wherein the controlling means includes means for interrupting the operation of the compensating means when the discriminating means detects that the stopping down operation is being performed.

11. The camera as claimed in claim 9, wherein the compensating means includes means for determining a compensating amount in accordance with the predetermined aperture value of the objective lens.

12. The camera as claimed in claim 9, wherein the discriminating means includes means for discriminating whether the preview operating member is being operated or not.

13. A camera system including a camera body and an objective lens for photographing, mountable on the camera body, comprising:
  a preview operating member;
  a release operating member;
  means for starting an exposure operation of the camera system in response to operation of the release operating member;
  means for stopping down an aperture diaphragm of the objective lens to a predetermined aperture value in response to operation of the preview operating member;
  means for discrminating whether the stopping down operation is being performed;
  means for producing data relating to the objective lens attached to the camera body;
  means for indicating an aperture value; and
  means for correcting the aperture value indicated by the indicated means based on the data produced by the data producing means when the discriminating means detects that the stopping down operation is being performed.

14. The camera system as claimed in claim 13, wherein the data producing means includes means for producing information relating to a changing amount of the aperture value resulting from a change of focal length of the objective lens.

15. The camera system as claimed in claim 13, further comprising:
  an AE lock operating member;
  means for measuring light transmitted through the objective lens to produce a light measuring signal relative to the measured light;
  means for calculating an exposure value in accordance with the light measuring signal;
  means for storing the light measuring signal in response to operation of the AE lock operating member;
  means for indicating an exposure time automatically controlled in accordance with the calculated exposure value; and
  means for correcting the exposure time indicated by the indicating means when the light measuring signal is stored in the storing means.

16. The camera system as claimed in claim 15, wherein the storing means stores a light measuring signal in response to operation of the AE lock operating member, in the condition in which the discriminating means detects that the stopping down operation is being performed.

17. The camera system as claimed in claim 16, wherein the storing means cancels the stored light measuring signal when the operation of the AE lock member is cancelled in a condition in which the storing means stores the light measuring signal.

18. The camera system as claimed in claim 13, further comprising:
  means for interrupting the operation of the stopping down means when the storing means stores the light measuring signal.

19. The camera system as claimed in claim 13, wherein the discriminating means includes means for discriminating whether the preview operating member is being operated or not.

20. A camera system including a camera body and an objective lens for photographing, mountable on the camera body, comprising:
  a preview operating member;
  an AE lock operating member;
  means for stopping down an aperture diaphragm of the objective lens to a predetermined aperture value in response to operation of the preview operating member;
  means for discriminating whether the stopping down operation is being performed;
  means for producing data relating to the objective lens attached to the camera body;
  means for measuring light transmitted through the objective lens to produce a light measuring signal relative to the measured light;
  means for calculating proper exposure time in accordance with the light measuring signal;
  means for storing the light measuring signal in response to operation of the AE lock operating member;

means for storing the data when the light measuring signal storing means stores the light measuring signal; and means for correcting the proper exposure time calculated by the calculating means in accordance with a difference between the data stored in the data storing means and data produced by the data producing means, when the discriminating means detects that the stopping down operation is being performed.

21. The camera system as claimed in claim 20, wherein the data producing means produces data according to a changing amount of the aperture value resulting from a change of focal length of the objective lens.

22. The camera system as claimed in claim 20, wherein the discriminating means includes means for discriminating whether the operating member is being operated or not.

23. A camera system including a camera body and an objective lens, comprising:

a preview operating member;
an AE lock operating member;
means for stopping down an aperture diaphragm of the objective lens to a predetermined aperture value in accordance with operation of the preview operating member;
first means for discriminating whether the stopping down operation is being performed;
means for measuring light transmitted through the objective lens to produce a light measuring signal relative to the measured light;
means for storing the light measuring signal in response to operation of the AE lock operating member;
second means for discriminating whether the storing means is operated or not; and
means for controlling the storing means to store a light measuring signal measured in the condition in which the aperture diaphragm is stopped down by the stopping down means, when the first discriminating means detects that the stopping down operation is performed while the storing means has been discriminated to be operated by the second discriminating means.

24. The camera system as claimed in claim 23, wherein the controlling means controls the storing means to store the light measuring signal measured after the aperture diaphragm is stopped down by the stopping means.

25. The camera system as claimed in claim 23, wherein the first discriminating means includes means for discriminating whether the preview operating member is being operated or not.

26. A camera system including a camera body and an objective lens, comprising:

a preview operating member;
an AE lock operating member;
means for stopping down an aperture diaphragm of the objective lens to a predetermined aperture value in accordance with operation of the preview operating member;
means for discriminating whether the stopping down operation is being performed;
means for measuring light transmitted through the objective lens to produce a light measuring signal relative to the measured light;
means for storing the light measuring signal in response to operation of the AE lock operating member; and
means for controlling the storing means to cancel the light measuring signal stored in the storing means when the discriminating means detects that the stopping down operation is cancelled after the storing means was once operated in the condition in which the stopping means has been operated.

27. The camera system as claimed in claim 26, wherein the controlling means controls the storing means to store the light measuring signal again after the stopping down operation is detected to be cancelled.

28. The camera system as claimed in claim 26, wherein the discriminating means includes means for discriminating whether the operating member is being operated or not.

29. A camera system including a camera body and an objective lens, comprising:

a preview operating member;
an AE lock operating member;
means for stopping down an aperture diaphragm of the objective lens to a predetermined aperture value in accordance with operation of the preview operating member;
means for measuring light transmitted through the objective lens to produce a light measuring signal relative to the measured light;
means for storing the light measuring signal in response to operation of the AE lock operating member;
means for discriminating whether the storing means is operated or not; and
means for controlling the stopping down means to interrupt the operation of the stopping down means when the discriminating means detects that the storing means is operated.

30. The camera system as claimed in claim 29, wheerein the discriminating means includes means for discriminating whether the AE lock operating member is being operated or not.

31. A camera system including a camera body and an objective lens, comprising:

a preview operating member;
means for stopping down an aperture diaphragm of the objective lens to a predetermined aperture value in accordance with operation of the preview operating member;
means for discriminating whether the stopping down operation is being performed;
means for discriminating whether an electric power battery is attached to the camera body or not; and
means for indicating a display when the electric power battery is discriminated to be attached to the camera body after the electric power battery has been detached from the camera body in a condition in which the discriminating means detects that the stopping down operation is being performed.

32. The camera system as claimed in claim 31, further comprising:

means for displaying an aperture value, and wherein the indicating means includes means for indicating a warning on the aperture value displaying means.

33. The camera system as claim in claim 32, wherein the indicating means includes means for indicating an indication other than the plurality of aperture values of the objective lens mounted on the camera.

34. The camera system as claimed in claim 32, wherein the indicating means includes means for indicating a warning from the start of operation of the stopping down means to cancellation thereof.

35. The camera system as claimed in claim 34, wherein the indicating means includes means for indicating an aperture value used for exposure control after cancellation of the stopping down means.

36. The camera system as claimed in claim 31, wherein the discriminating means includes means for discriminating whether the preview operating member is being operated or not.

* * * * *